United States Patent Office 3,214,460
Patented Oct. 26, 1965

3,214,460
N,N-DIETHYL AND N-METHYL, N-BUTYL DOCOSYL SUCCINAMATE
Hansel L. McGee, New York, and Paul M. Schwartz, Mahopac, N.Y., assignors to International Business Machines Corporation, New York, N.Y., a corporation of New York
No Drawing. Filed Dec. 26, 1961, Ser. No. 162,280
3 Claims. (Cl. 260—482)

This invention relates to new chemical compounds having wax-like characteristics and to processes for preparing the same. This invention further relates to a new amido-ester synthetic wax which has all the valuable characteristics of natural waxes and, in addition, certain desirable properties peculiar to itself.

Natural waxes, such as montan, ouricuri and carnauba wax, in which the essential molecular structure is the same, have found many applications in the field of coatings due to their film forming and polishing characteristics. These natural waxes and carnauba wax in particular produce a very hard, durable, non-smearing lustrous film. In addition, because of unique properties, montan, ouricuri and carnauba waxes have been found to be especially satisfactory as a major ingredient of carbon transfer inks of the hot melt type, such as are employed in the manufacture of carbon paper.

The excellent properties of the natural waxes, for example, carnauba wax and montan wax, are to some extent offset by certain disadvantages. In particular, the natural waxes are not always uniform in composition. The natural waxes vary in composition due to the different techniques of purification and refining, or they may have been adulterated with less desirable waxes, such as paraffin wax. Thus it is highly desirable to obtain a synthetic wax which is not subject to variations, uncontrollable or otherwise, which would render the natural wax unsuitable for various applications.

These synthetic waxes not only exhibit utility as waxes themselves, but also as additives to carbon transfer ink formulations, automobile paste and liquid polishes and as synthetic lubricants. These synthetic waxes can replace or fortify natural waxes, for example, montan, ouricuri and carnauba wax, when used in the above suggested applications. They can also be used as plasticizers.

The synthetic waxes of the present invention provide a material of dependable and predictable composition and properties which can be used in the formulation of carbon transfer inks, automobile paste and liquid polishes, etc.

The principal object of the invention is to produce from staple raw materials a synthetic wax which can be manufactured under convenient commercial conditions and at a moderate cost.

An object of the present invention is to provide a class of compounds having desirable wax-like properties and which are useful as substitutes for natural waxes.

Another object of the present invention is the preparation of compounds which have properties comparable to those of natural waxes both considered alone and when formulated into polishing compositions, carbon transfer inks, etc.

A further object of the invention is to provide synthetic waxes which can be synthesized from available chemicals.

Another object of the invention is to provide synthetic waxes of dependable properties, composition, purity, etc., which are capable of replacing, without sacrifice of desirable characteristics, more expensive natural waxes in various formulations, for example, carbon transfer inks, paste and liquid wax polishes, etc.

The foregoing and other objects, features and advantages of the invention will be apparent from the following more particular description of preferred embodiments of the invention.

The synthetic waxes of the present invention are amido-esters formed by the reaction of an acid ester having the formula:

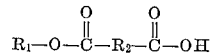

wherein $R_1$ is an alkyl radical having from 16–22 carbon atoms, and wherein $R_2$ is an alkylene radical having from 2–8 carbon atoms and an amine of the general formula:

wherein $R_3$ and $R_4$ are selected from the group consisting of hydrogen and an alkyl radical having from 1–22 carbon atoms. These amido-esters have the following general formula:

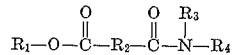

In the above formula, $R_1$ is an alkyl radical having from 16–22 carbon atoms, $R_2$ is an alkylene radical having from 2–8 carbon atoms and $R_3$ and $R_4$ are selected from the group consisting of hydrogen and an alkyl radical having from 1–22 carbon atoms.

The acid ester

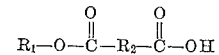

is prepared as set forth in the copending U.S. patent application Ser. No. 81,273, by Callinan et al., filed January 9, 1961, entitled "Substitutes for Carnauba Wax and Transfer Ink Compositions Containing Such Substitutes." This copending application is herewith incorporated by reference. The process of preparation is as follows: Equal moles of the desired acid anhydride and alcohol were mixed in a flask fitted with a reflux condenser. A five fold excess of toluene (based on the weight of alcohol) was added as a solvent. The mixture was then refluxed until the reaction had gone to completion (approximately 5 hours). The solvent was then removed in vacuo, and the residue crystallized in a suitable solvent. Thus, the acid ester is now formed and ready to be used in the preparation of the amido-ester synthetic wax.

The amido-ester synthetic wax may be prepared in several ways. The acid esters,

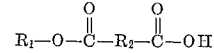

are converted to the acyl chlorides by reacting 1 mole of the acid ester with an appropriate amount of an acyl chloride forming reagent. The acyl chloride forming reagents which may be used are phosphorus pentachloride, thionyl chloride, sulfuryl chloride, and phosphorus trichloride, etc.

If thionyl chloride is used as the acyl chloride forming reagent, approximately 1 mole of the acid ester is mixed with 2 moles of the thionyl chloride. The mixture which results is heated to a temperature of 30°–40° C. and allowed to reflux for 20 hours. The excess thionyl chloride is removed by distilling at low pressure (for example, 1 mm. Hg). The solid residue which remains is the crude acyl chloride of the corresponding acid ester. (Yield is 70% of theoretical.)

Alternately, phosphorus pentachloride can be used as the acyl forming chloride reagent. In this case, a suspension of the acid ester (1 mole) in anhydrous ethyl ether is cooled to −10° C. and 1.2 moles of phosphorus pentachloride is added thereto. The mixture is stirred for two hours at that temperature, after which time the reaction mixture is filtered and washed with anhydrous ethyl ether.

The crude acyl chloride of the corresponding acid ester remains. (Yield is 90% of the theoretical.)

Now the acyl chloride of the corresponding half ester is reacted with an amine

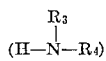

If $R_3$ and $R_4$ are both hydrogen ($NH_3$) then an unsubstituted amido-ester synthetic wax results $$(R_1-O-\overset{O}{\underset{\|}{C}}-R_2-\overset{O}{\underset{\|}{C}}-\overset{H}{\underset{|}{N}}H)$$

If one or both of $R_3$ and $R_4$ are an alkyl radical having from 1–22 carbon atoms, then a substituted amido-ester synthetic wax results $$(R_1-O-\overset{O}{\underset{\|}{C}}-R_2-\overset{O}{\underset{\|}{C}}-\overset{H}{\underset{|}{N}}-R_4)$$

$$(\text{or } R_1-O-\overset{O}{\underset{\|}{C}}-R_2-\overset{O}{\underset{\|}{C}}-\overset{R_3}{\underset{|}{N}}-R_4)$$

The crude amido-ester so obtained may then be purified by recrystallization from suitable solvents or by distillation in vacuo.

The amine

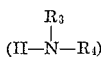

reactants utilizable herein are $NH_3$ or primary or secondary amines. The primary or secondary amines are preferably those mono- or di-alkylamines having up to 22 carbon atoms per alkyl radical. The alkyl radicals may be straight chain or branched chain. The two alkyl radicals in the secondary amine reactant may be the same or they may be different, i.e. a combination of branched and straight chains and/or radicals of different chain lengths. Illustrative examples of primary and secondary amines that may be used in carrying out the method illustrated in the present invention are:

| | |
|---|---|
| Methylamine | Dibutylamine |
| (monomethylamine) | Amylamine |
| Dimethylamine | Octylamine |
| Ethylamine | Decylamine |
| Diethylamine | Octadecylamine |
| Propylamine | Methylethylamine |
| Isopropylamine | Docosylamine |
| Dipropylamine | Didocosylamine |
| Diisopropylamine | Methylbutylamine |
| Butylamine | Methylpropylamine |
| Isobutylamine | Ethylpropylamine |
| Sec-butylamine | Ethylbutylamine |

An unsubstituted amido-ester synthetic wax may be prepared as follows:

1 mole of the acyl chloride of the corresponding acid ester is slowly added with stirring to 1 liter of concentrated ammonium hydroxide (this compound is used as a source of $NH_3$) which has been cooled in an ice-salt bath to $-10°$ C. After all of the acyl chloride of the acid ester has been added, the mixture is stirred for one hour. The reaction mixture is then filtered and the residue is washed with water. After drying in a vacuum oven at a temperature of 50° C. for 4 hours, the crude unsubstituted amido-ester synthetic wax is recrystallized from a suitable hot solvent, such as for example ethanol.

A substituted amido-ester acid synthetic wax may be prepared in the following manner:

1 mole of the acyl chloride of the corresponding acid ester is added to a solution containing 1 mole of an alkylamine and 1.1 moles of triethyl amine. The mixture is stirred for 3 hours while cooling to $-10°$ C. in an ice-salt bath. The reaction product precipitates as it is formed and is filtered, washed with water and dried. The substituted amido-ester synthetic wax is purified by re- crystallizing from hot chloroform or hot tetrahydrofuran. (Yields are about 70%–80% of the theoretical.)

An alternate method of preparing substituted amido-esters involves the use of dicyclohexylcarbodiimide as a coupling agent. This method produces yields of only 40–50% of theoretical, whereas the other methods set forth obtain much higher yields. The procedure is as follows:

A solution containing 1 mole of the acid ester, 1 mole of the alkylamine, and 1.1 mole of dicyclohexylcarbodiimide was stirred at room temperature for 20 hours. The precipitated crude substituted amido-ester was filtered and recrystallized from hot chloroform. The hot solution is also filtered to remove the insoluble urea formed as a side product in this reaction.

Solvents which can be used for the recrystallization purification of the crude amido-ester include methanol, ethanol, isopropanol, n-butanol, isobutanol, primary amyl alcohol, methyl amyl alcohol, 2-ethyl butanol, 1-hexanol, 2-ethyl hexanol, 2,6-dimethyl-4-heptanol, isodecanol, 2,6,8-trimethyl-4-nonanol, undecanol, tetradecanol, heptadecanol, acetone, amyl acetate, ethyl acetate, chloroform, tetrahydrofuran and a tetrahydrofuran-ethyl alcohol mixture.

Aromatic and aliphatic hydrocarbon solvents may also be used such as for example xylene, mesitylene, p-cumene, ethyl benzene, pentane, hexane, octane, decane, dodecane.

These amido-esters are valuable as synthetic waxes and can be used for the known intended uses of the natural waxes.

In summary the amido-esters are formed as follows:

$$R_1-O-\overset{O}{\underset{\|}{C}}-R_2-\overset{O}{\underset{\|}{C}}-OH + \text{acyl chloride forming reagent} \longrightarrow$$

$$R_1-O-\overset{O}{\underset{\|}{C}}-R_2-\overset{O}{\underset{\|}{C}}-Cl$$

(acyl chloride of corresponding acid ester)

$$R_1-O-\overset{O}{\underset{\|}{C}}-R_2-\overset{O}{\underset{\|}{C}}-Cl + H-\overset{R_3}{\underset{|}{N}}-R_4 \longrightarrow$$

(acyl chloride of corresponding acid ester)     (amine)

$$R_1-O-\overset{O}{\underset{\|}{C}}-R_2-\overset{O}{\underset{\|}{C}}-\overset{R_3}{\underset{|}{N}}-R_4$$

(amido-ester synthetic wax)

Thus, the amido-ester synthetic waxes of the present invention have the general formula $$R_1-O-\overset{O}{\underset{\|}{C}}-R_2-\overset{O}{\underset{\|}{C}}-\overset{R_3}{\underset{|}{N}}-R_4$$

In this formula: $R_1$ is an alkyl radical having from 16–22 carbon atoms. Exemplary of the $R_1$ alkyl radicals are n-hexadecyl, n-heptadecyl, n-octadecyl, n-nonadecyl, n-eicosyl, n-heneicosyl, n-docosyl, and the various positional isomer thereof, such as, for example, t-hexadecyl, t-eicosyl, and iso-octadecyl.

$R_2$ is an alkylene radical having from 2–8 carbon atoms. Exemplary of $R_2$ alkylene radicals are ethylene, propylene, butylene, pentylene, hexylene, heptylene, octylene, and the various positional isomers thereof, such as, for example, iso-propylene, t-butylene, iso-pentylene, and iso-octylene.

$R_3$ and $R_4$ are selected from the group consisting of hydrogen and alkyl radicals having from 1–22 carbon atoms. Exemplary of the $R_3$ and $R_4$ alkyl radicals are methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl and the various positional isomers thereof, such as iso-propyl, iso-butyl, t-butyl, sec-butyl, iso-amyl, t-amyl, iso-hexyl, t-heptyl, iso-octyl, 2- ethylhexyl, t-octyl, t-decyl, t-pentadecyl, t-nonadecyl, and t-dodecyl.

The following amido-ester synthetic waxes which are examples of the invention, may be prepared by procedures similar to those outlined above and in the subsequent specific examples:

TABLE I

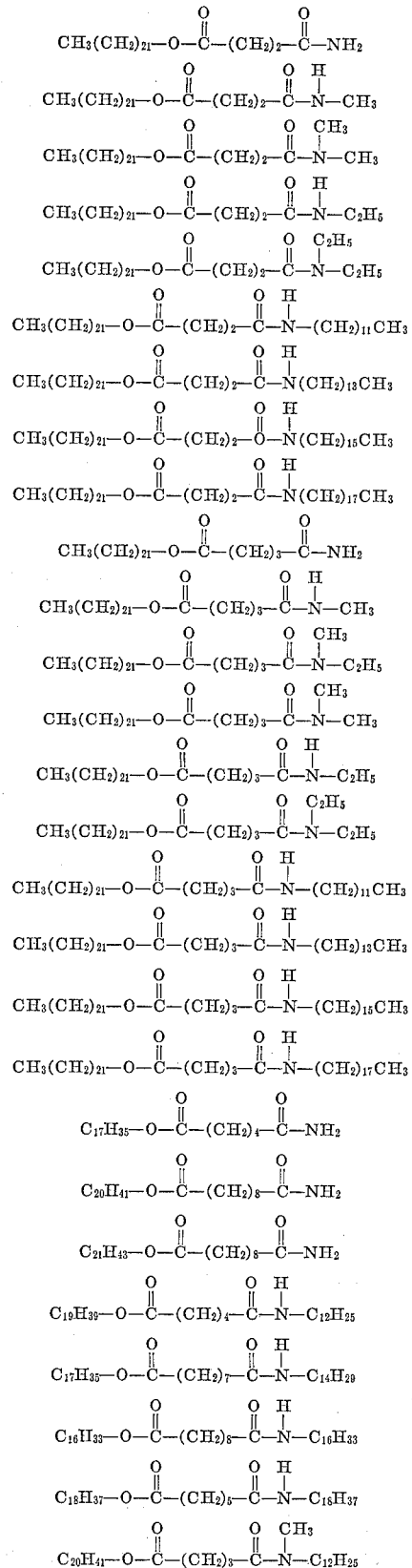

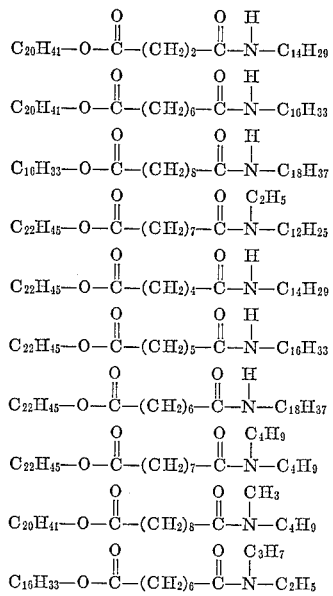

The following specific examples of the preparation of the amido-ester synthetic waxes will be helpful to a clear understanding of the invention:

*Example 1.—N-stearyl docosyl succinamate*

In a reaction flask containing 1000 ml. of diethyl ether was suspended 370.64 g. (1 mole) of monodocosyl succinate. The mixture was cooled to $-10°$ C. in an ice-salt bath. To this mixture was added, with stirring, 229.08 g. (1.1 moles) of phosphorus pentachloride. After one hour the mixture was filtered and washed with diethyl ether. The acyl chloride formed was added immediately to a solution containing 269.58 g. (1 mole) of stearyl amine in 1000 ml. of chloroform and 111.30 g. (1.1 moles) of triethylamine. This mixture was stirred, while cooling to $-10°$ C. in an ice-salt bath, for three hours. The product was filtered, dried and recrystallized from hot chloroform. A white crystalline material having a melting point of $90°-92°$ C. resulted. A yield of 78% was obtained.

*Example 2.—Octadecyl glutaramide*

A suspension of 384.7 g. (1.0 mole) of monooctadecyl glutarate in 1.5 liters of anhydrous diethyl ether was cooled to $-70°$ C. in an ice-salt bath. To this mixture was added 226 g. (1.09 moles) of phosphorus pentachloride with stirring. After one hour the mixture was filtered and washed with anhydrous diethyl ether. The acyl chloride thus formed was immediately added to 2.5 liters of cold concentrated ammonium hydroxide with stirring. The reaction was cooled to $-10°$ C. in an ice-salt bath and stirred for two hours. After filtering and washing the precipitate with water, the product was dried in a vacuum oven at $50°$ C. for 4 hours. Recrystallization from hot chloroform yielded 300 gms. (77.8%) of a white crystalline material with a melting point of $98°-99°$ C.

*Example 3.—N-diethyl docosyl succinamate*

To a solution of 500 millimeters of diethyl amine in 500 millimeters of distilled water is slowly added the acyl chloride formed from 370.64 grams (1 mole) of monodocosyl succinate and 207.9 grams of phosphorus pentachloride. The mixture is cooled to $-10°$ C. in an ice-salt bath and stirred for one hour. The precipitated product is then filtered and washed with water. After drying the crude product is recrystallized in benzene yielding 340.6 grams (80%) of a white crystalline material having a melting point of $80°-81°$ C.

The following examples set forth in Table II illustrate the preparation of other amido-ester synthetic waxes.

The acid ester in anhydrous ethyl ether is mixed with 207.9 grams of phosphorus pentachloride at −10° C. in each example for approximately two hours to form the acyl chloride of the acid ester. The acyl chloride of the acid ester is then reacted with the amine indicated to form the amido-ester synthetic wax set forth.

sentially of a wax, a hydrocarbon oil, a coloring substance, usually carbon blacks and/or toner. Varying the ratios of these components allows the final characteristics of the ink to be varied.

Conventional carbon paper inks usually contain a natural wax (for example, carnauba wax) either as the sole

TABLE II

| Example | Reactants | | Product |
|---|---|---|---|
| | Acid ester (grams) | Amine (grams) | Amido-ester synthetic wax (grams) |
| 4 | Monohexadecyl succinate, 342.6 g. (1 mole) | NH₄OH, 1.5 liters | Hexadecyl succinamide, 273.3 g. |
| 5 | Monodocosyl glutarate, 440.8 g. (1 mole) | Methyl amine, 62.1 g. (2 moles) | N-methyl docosyl glutaramate, 317.7 g. |
| 6 | Monooctadecyl suberate, 426.8 g. (1 mole) | Diethyl amine, 146.3 g. (2 moles) | N-diethyl octadecyl suberamate, 375 g. |
| 7 | Monoeicosyl suberate, 454.8 g. (1 mole) | Methyl butyl amine, 174.3 g. (2 moles) | N-methyl N-butyl eicosyl suberamate, 386.4 g. |
| 8 | Monodocosyl sebacate, 530.9 g. (1 mole) | Docosyl amine, 280.3 g. (1 mole) | N-docosyl docosyl sebacamate, 455.2 g. |
| 9 | Monohexadecyl succinate, 342.6 g. (1 mole) | Methyl butyl amine, 174.3 g. (2 moles) | N-methyl N-butyl hexadecyl succinamate, 289.0 g. |
| 10 | Monoeicosyl sebacate, 482.9 g. (1 mole) | Methyl amine, 62.1 g. (2 moles) | N-methyl eicosyl sebacamate, 297.4 g. |
| 11 | Monooctadecyl suberate, 426.8 g. (1 mole) | Docosyl amine, 280.3 g. (1 mole) plus 1.1 mole triethyl amine. | N-docosyl octadecyl suberamate, 315 g. |
| 12 | Monodocosyl glutarate, 440.8 g. (1 mole) | Methyl ethyl amine, 118.26 g. (2 moles) | N-methyl N-ethyl docosyl glutaramate, 331.5 g. |
| 13 | Monohexadecyl succinate, 342.6 g. (1 mole) | Hexadecyl amine, 208.19 g. (1 mole) | N-hexadecyl hexadecyl succinamate, 368.9 g. |

The amido-ester synthetic waxes of the present invention prepared according to the preceding examples are white crystalline solids, having a melting point in the range 80°–130° C. The high sharp melting point, hardness, ductility, adhesiveness, compatibility, dispersing action for carbon black, oil retention and retention of hardness when diluted with mineral oil which these synthetic waxes exhibit is the reason these compounds can be used for the same purposes for which the natural waxes of carnauba, ouricuri, and montan are used. For example, these waxes may be used in polishes (paste and liquid), carbon transfer inks, as mold lubricants, synthetic lubricants, etc.

The similarity in general steric aspect of the synthetic waxes to the natural waxes is reflected in their hardness, high melting point, ductility, gloss and their compatibility with natural waxes and solvents for said waxes.

Bi-dipolar compounds are generally harder and have higher melting points than simple esters. When amido groups are attached to these bi-dipolar compounds hardness and the melting points are even greater. This is due to the ability of these compounds to display a large degree of hydrogen bonding.

Amides characteristically exhibit a high degree of hydrogen bonding. This hydrogen bonding results in higher melting and boiling points of amides than their acid counterparts. Consequently, amido-esters have higher melting points than the acid esters from which they are formed.

Equally important is that hydrogen bonding allows an orderly arrangement of the molecules. This orderly arrangement can result in a more compact and denser compound. The increased hardness of these amido-ester waxes as compared to the acid ester waxes can be attributed to this compactness of molecular arrangement.

The increased melting point and hardness of amido-ester waxes make these materials useful in lubricants especially where high temperatures are required. Hardness in a wax is desirable in polish formulations where a hard tough film is most desirable.

The amido-ester synthetic waxes of the present invention have the desirable melting points which permit them to be incorporated in ink formulations which are used in the manufacture of carbon paper. Such links are of the hot melt type. This means that the inks are heated to approximately 100° C. so that they become very fluid and can be coated on a paper backing. "Drying" is accomplished by allowing the ink to return to normal temperature. Although several different carbon paper ink formulations are used they are all composed essentially of a wax component or blended with other waxes. The natural waxes, especially carnauba wax, give really satisfactory overall results in terms of coating ease, lack of smear, excessive tack and offsetting. After thoroughly dispersing the natural wax (e.g. carnauba wax) with paraffin or mineral oil and carbon black and heating, the composition attains a fluidity which enables it to be roller-coated on a paper base to produce an even, smooth uniform coating. Upon hardening the inks show good retention of the oil and are relatively free from smudging.

The new carbon transfer ink compositions produced according to the present invention duplicate very closely the properties and performance of conventional ink compositions containing carnauba wax. In addition, the new ink compositions exhibit superior properties and performance as compared with ink compositions containing ouricuri and montan wax. It is theorized that this is the result of the duplication in the amido-ester synthetic wax compounds of the bi-dipolarity, found in the esters which make up the major ingredient of natural waxes such as especially carnauba wax and ouricuri and montan wax. The presence of the amido group further enhances the synthetic wax by increasing its hardness and melting point by providing more chances for hydrogen bonding thus rendering the synthetic wax more polar.

Accordingly, the novel carbon transfer ink compositions of the present invention comprise paraffin ink oils, carbon blacks and compounds of the class described having the following general formula:

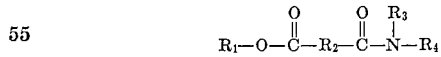

wherein $R_1$ is an alkyl radical having from 16–22 carbon atoms, $R_2$ is an alkylene radical having from 2–8 carbon atoms and $R_3$ and $R_4$ are selected from the group consisting of hydrogen and alkyl radicals having from 1–22 carbon atoms.

The following are examples of the preparation of typical carbon paper inks according to the present invention.

*Example 14*

A basic ink formulation was prepared by adding 25.8 grams of N-methyl docosyl succinamate to a five and one half ounce capacity stainless steel mill. 25.8 grams of paraffin ink oil were then added to the mill and the mill was placed on a hot plate to melt the wax. The N-methyl docosyl succinamate begins to melt at about 83°–84° C. After the N-methyl docosyl succinamate has been completely melted, 8.4 grams of carbon black and 3 grams of nigrosine oleate toner were added and the heating is continued. When the temperature reaches 100°

C., hot steel balls are added and the mill is shaken vigorously for about 10 minutes. During this time, the temperature in the mill drops to about 75° C. The ink is then transferred to a standard carbon paper coating machine and is coated on a standard carbon paper blacking. After tests for printability and wear, it was found that the novel carbon paper ink composition, comprising N-methyl docosyl succinamate as a substitute for carnauba wax, compared favorably with inks containing the natural wax.

*Example 15*

An ink composition is prepared according to the steps outlined in Example 14, except that 25.8 grams of docosyl glutaramate are substituted in the formulation for the N-methy docosyl succinamate.

*Example 16*

An ink is prepared as in Example 14, except 25.8 grams of N-methyl N-butyl docosyl succinamate are substituted for the N-methyl docosyl succinamate.

*Example 17*

An ink is prepared according to the method in Example 14, except that 25.8 grams of N-diethyl dosocyl succinamate are substituted for the N-methyl docosyl succinamate.

*Example 18*

An ink composition is prepared according to the process in Example 14, except 25.8 grams of a 1:1 mixture of docosyl succinamide and N-ethyl docosyl succinamate are substituted for the N-methyl docosyl succinamate.

The amido-ester synthetic waxes of the present invention or mixtures thereof may also be used in the formulation of magnetic transfer ribbon inks in place of, or in addition to the natural wax ordinarily used.

Printability of the foregoing ink compositions as determined by the quality of a fifth carbon copy prepared with the formulated inks was uniformly good in all cases tested.

The paraffin ink oils used in the above examples are available from commercial sources, such as the Gulf Oil Company. The exact composition of the oil is not known, but they are generally identified as polycyclic, high-boiling petroleum fractions that have been de-colorized by activated fuller's earth or bauxite.

The carbon blacks employed in the manufacture of carbon paper inks are what are generally defined as channel blacks. Channel blacks of the long flow variety are generally preferred for use in carbon papers and are available commercially under the following trade names, Kohinoor (Imperial Oil and Gas Company), Witcolith (Continental Carbon Company), Mogul (Godfrey L. Cabot, Incorporated), and Peerless (Columbian Carbon Company).

Toners and other dispersing agents are frequently added to carbon paper ink compositions to obtain desired properties. Toners are prepared by precipitation of organic dyes onto the surface of carbon blacks.

The proportions of synthetic wax, oil and carbon black may be varied within fairly wide ranges according to the properties desired in the final ink coating. Generally, the basic ingredients in carbon transfer ink compositions of the present type may vary within the following ranges: synthetic wax from 30% to 50% by weight of the composition, paraffin ink oil from 10% to 50%, and carbon blacks from about 2% to 20%. Up to about 30% of toners and other optional additives may also be included.

The amido-ester synthetic waxes of the present invention have satisfactory melting points which enable them to be formulated into inks and coated by standard coating machines without important departure from conventional practice. These synthetic waxes duplicate and in some instances exhibit superior properties when the properties are compared to the carnauba, ouricuri and montan natural waxes for example, higher melting points, greater hardness, lack of smear etc.

The amido-ester synthetic waxes of the present invention are particularly useful as an ingredient for various polishing compounds due to its high melting point, its freedom from tack and its ability to take a high polish. The synthetic waxes produce a hard, lustrous film.

A typical polishing formulation in paste or suspension form using the synthetic wax of the invention consists of a silicone, one or more waxes and a solvent. The silicon imparts clarity, ease of polishing, gloss, water repellence and durability to the polish. The waxes add their known qualities (as set forth above) and combinations of waxes are used to provide certain desirable characteristics which are not obtained from a single wax.

The solvent serves as a vehicle for all of the other constituents and is dependent to some extent upon the particular surface to be treated.

A formulation for an automobile paste wax using the amido-ester synthetic wax would be as follows:

| Ingredient: | Amount (parts by weight) |
|---|---|
| N-stearyl docosyl succinamate | 37 |
| Paraffin wax | 24 |
| Coal tar naphtha | 139 |
| Phenylpolysiloxane | 2 | melt the N-stearyl docosyl succinamate, paraffin wax and the silicone together in a jacketed kettle at a temperature of 90–90° C., then add the coal tar naphtha, stirring the batch meanwhile. Continue heating until the waxes are completely dissolved in the naphtha. Then cool the batch to the pouring temperature, which is about 80° C.

The paste wax made with N-stearyl docosyl succinamate is firm. It is easily applied to the surface to be polished (e.g. an automobile) and easily rubbed to a high gloss with a clean dry cloth. The surfaces polished with this paste wax are found to repel water.

The above paste wax can be used to impart a high luster to all kinds of smooth, painted metal surfaces, especially automobile bodies. However, its use is not to be limited to automobiles. It can be used on furniture, stoves, refrigerators, etc.

The amido-ester synthetic waxes can also be used to fortify natural waxes such as carnauba, ouricuri or montan when used in the above suggested applications.

While the invention has been particularly described with reference to preferred embodiments thereof, it will be understood by those skilled in the art that various changes in form and details may be made therein without departing from the spirit and scope of the invention.

What is claimed is:

1. A compound selected from the group consisting of N,N-diethyl docosyl succinamate and N-methyl, N-butyl docosyl succinamate.
2. N,N-diethyl docosyl succinamate.
3. N-methyl, N-butyl docosyl succinamate.

References Cited by the Examiner

UNITED STATES PATENTS

| 2,238,928 | 4/41 | Cahn et al. | 260—404 |
| 2,245,593 | 6/41 | Katzman | 260—404 |
| 2,331,194 | 10/43 | Irion | 106—31 |
| 2,519,321 | 8/50 | Newman | 106—31 |
| 2,742,432 | 4/56 | Messina | 260—482 X |
| 2,783,206 | 2/57 | Messina | 252—392 X |

OTHER REFERENCES

Wagner: Synthetic Organic Chemistry, pp. 547–548 and 566 (1953).

LORRAINE A. WEINBERGER, *Primary Examiner.*

MARCUS LIEBMAN, LEON ZITVER, *Examiners.*

UNITED STATES PATENT OFFICE
CERTIFICATE OF CORRECTION

Patent No. 3,214,460                              October 26, 1965

Hansel L. McGee et al.

It is hereby certified that error appears in the above numbered patent requiring correction and that the said Letters Patent should read as corrected below.

Column 5, lines 26 and 27, the formula should appear as shown below instead of as in the patent:

same column 5, lines 58 and 59, the formula should appear as shown below instead of as in the patent:

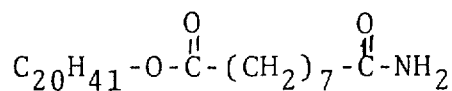

column 7, line 68, for "links" read -- inks --; column 10, line 11, for "silicon" read -- silicone --; line 30, for "90-90° C." read -- 90-95° C. --.

Signed and sealed this 13th day of December 1966.

(SEAL)
Attest:

ERNEST W. SWIDER                              EDWARD J. BRENNER
Attesting Officer                             Commissioner of Patents